March 3, 1970 NOBUTOSHI KIHARA ET AL 3,499,109

AVOIDANCE OF RESOLUTION DEGRADATION DUE TO RESIDUAL IMAGE PHENOMENA IN TELEVISION CAMERAS

Filed July 25, 1966 2 Sheets-Sheet 1

INVENTORS
NOBUTOSHI KIHARA
TAKAO AOKI
BY Ward, Haselton, McElhannon, Brooks & Fitzpatrick
ATTORNEYS March 3, 1970 NOBUTOSHI KIHARA ET AL 3,499,109

AVOIDANCE OF RESOLUTION DEGRADATION DUE TO RESIDUAL IMAGE PHENOMENA IN TELEVISION CAMERAS

Filed July 25, 1966 2 Sheets-Sheet 2

INVENTORS
NOBUTOSHI KIHARA
BY TAKAO AOKI

Ward, Haselton, McElhannon, Orme, Brooks & Fitzpatrick
ATTORNEYS

United States Patent Office

3,499,109
Patented Mar. 3, 1970

3,499,109

AVOIDANCE OF RESOLUTION DEGRADATION DUE TO RESIDUAL IMAGE PHENOMENA IN TELEVISION CAMERAS

Nobutoshi Kihara, Shinagawa-ku, Tokyo, and Takao Aoki, Kawasaki-shi, Kanagawa-ken, Japan, assignors to Sony Corporation, Tokyo, Japan, a corporation of Japan Filed July 25, 1966, Ser. No. 571,954
Claims priority, application Japan, July 28, 1965, 40/46,091
Int. Cl. H04n *5/38*
U.S. Cl. 178—7.2 14 Claims

ABSTRACT OF THE DISCLOSURE

The photoelectrically sensitive screen of a television camera is intermittently exposed to light images of the objects to be reproduced and the screen is shielded from the light images during the intervals between successive exposures, the screen is electronically scanned a plurality of times during each of the intervals between successive exposures, and the electrical signals thus produced are gated to remove therefrom all signals except those produced during the first electronic scan after each exposure.

Figure 1:
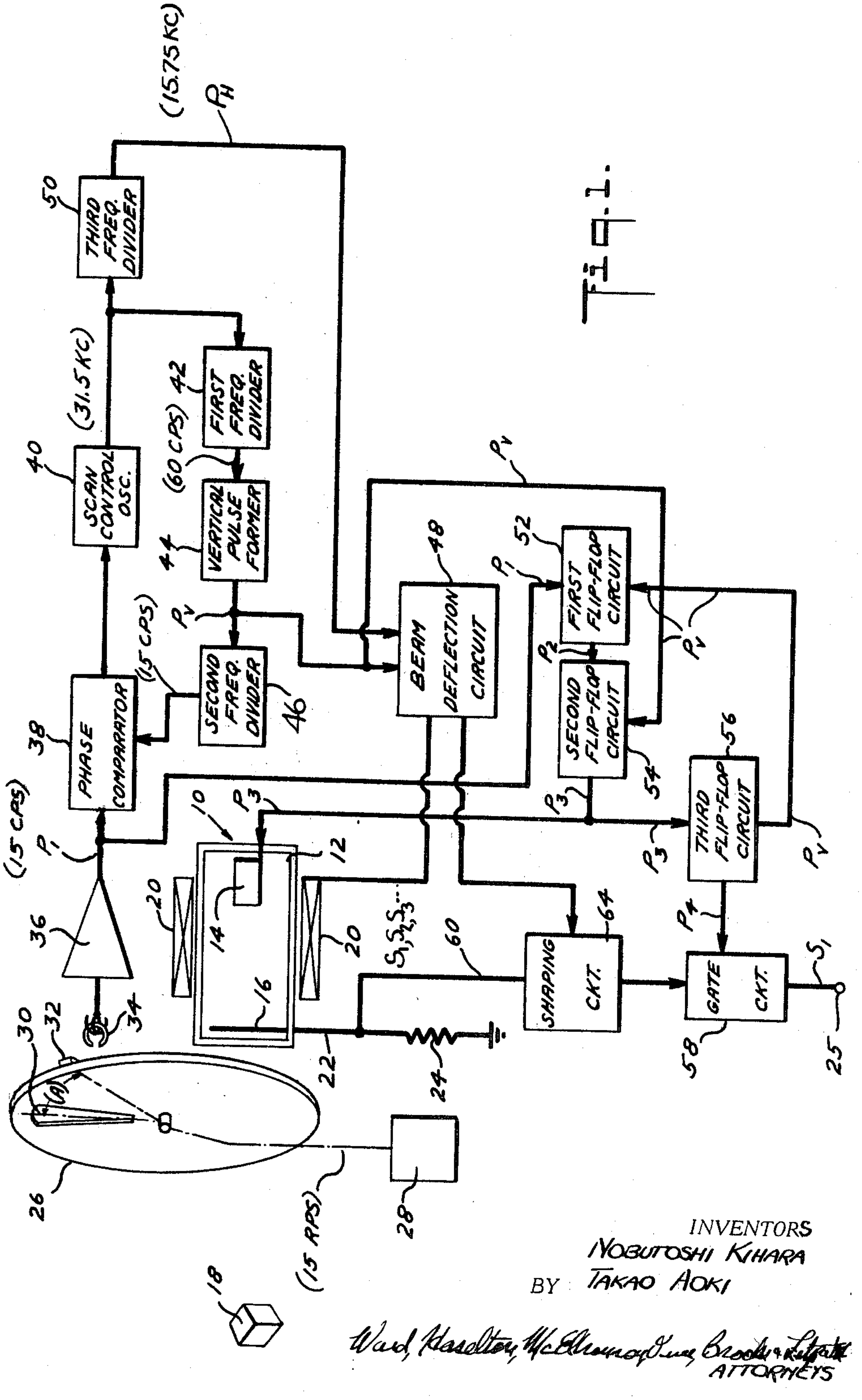

This invention relates to the acquisition of images and the electronic transduction thereof for use in television systems. More particularly the present invention relates to the avoidance of resolution degradation caused by the residual image phenomena in vidicon and similar type television cameras.

Television cameras of the vidicon type utilize a tube similar to a cathode ray tube. The image, whose picture is to be acquired and converted to electrical signals, is focused onto a photoelectrically sensitive target screen at the front of the tube; and the variations in light comprising the image are caused to alter the electrical characteristics of the various elemental areas of the target screen. An electron beam is generated within the tube; and this beam is caused to scan the target screen. Depending upon the electrical characteristics of the various elemental areas intercepted by the scanning beam, different electrical signals will be generated, and these signals may be transmitted, recorded or played back on a monitor.

In addition to producing electrical signals representative of the light intensity variation produced upon the screen, the scanning electron beam additionally discharges or electrically neutralizes the screen as it passes over it so that the screen will be ready to accept a new image. Unfortunately however, the discharging effect of a single scan does not entirely remove the previous image. Thus when a new image is produced upon the screen, a certain amount of overlap results from the presence of residual portions of previous images. This causes blurring and general deterioration in resolution or picture quality. This deterioration is especially noticeable where fast moving or otherwise changing images are to be televised.

The present invention overcomes the above described image resolution difficulties associated with vidicon type television cameras. According to one of the features of the present invention, it is possible to provide the acquisition of moving images without producing the residual image effects which result in resolution deterioration.

According to another feature of the present invention it is possible to produce such image acquisition and transduction in such a manner that the signals obtained thereby are readily useable with certain video tape recorders.

Basically, the present invention involves the exposure of the camera to the image being acquired for a period of time less than the period of a single field of scan of the camera. During this time, no signals are produced by the camera. However, the camera is then shielded from the image for a duration corresponding to a plurality of successive scans. The camera output is then gated so that only those signals produced as a result of the first scan following exposure are used for signal transmission. The remaining scans which occur prior to the next subsequent exposure are used to complete the neutralization of the target screen; but they are not used for signal transmission. Thus, when the camera is exposed to a new image, there will be no residual effects remaining on the screen from the preceding image.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

Figure 2:
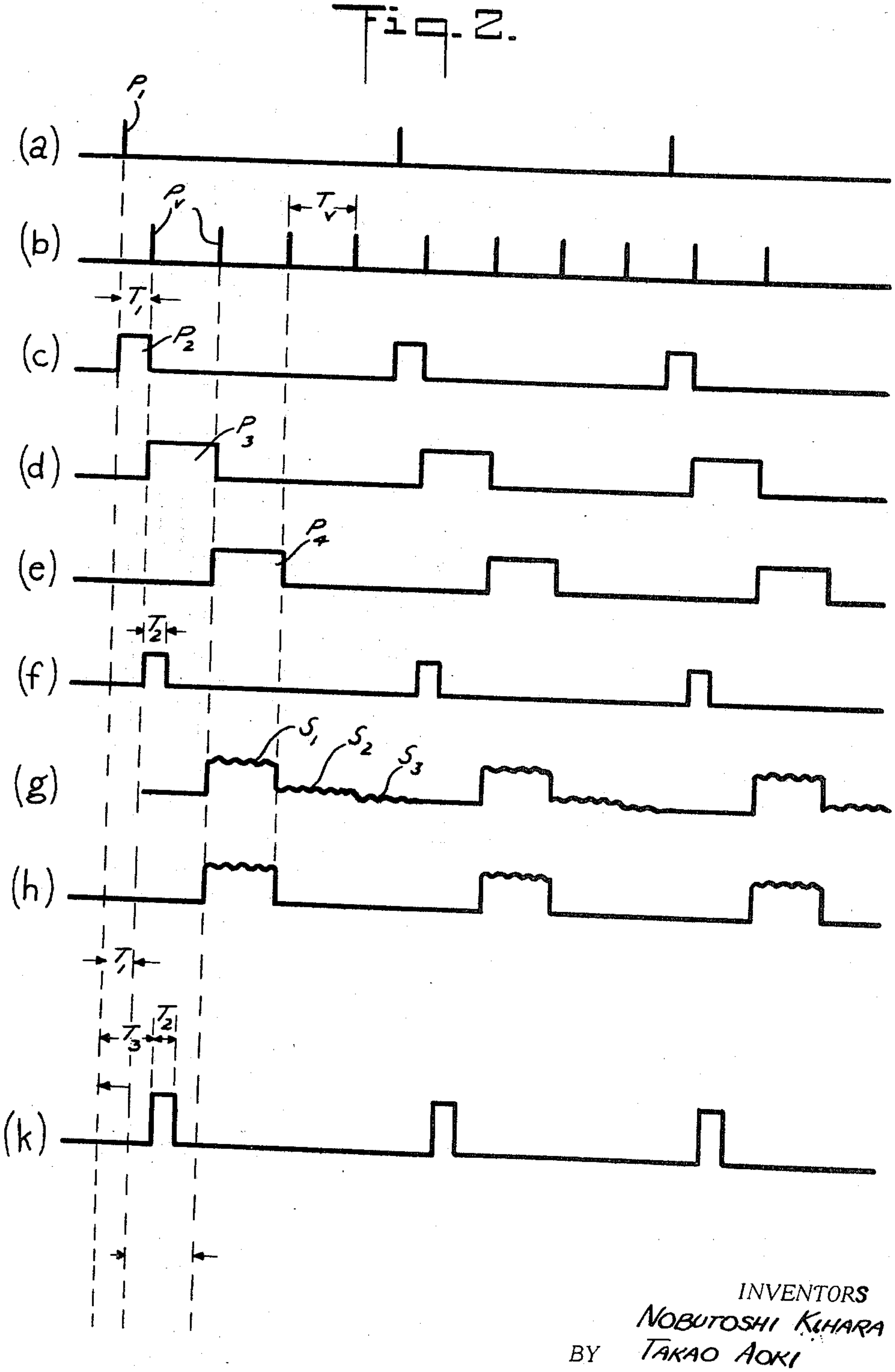

A specific embodiment of the invention has been chosen for purposes of illustration and description, and is shown in the accompanying drawings, forming a part of the specification, wherein:

FIG. 1 is a block diagram illustrating an image acquisition and electronic transduction system according to the present invention; and FIG. 2 (*a* through *i*) is a series of wave forms illustrating the time relationship of signals and various locations throughout the system of FIG. 1 for purposes of understanding the operation of that system.

In FIG. 1, there is provided a television camera 10 of the vidicon type. This camera comprises a vacuum envelope 12 inside of which at one end there is provided an electron gun 14, and at the other end of which is provided a target screen 16. An object 18, whose image is to be acquired and electronically transduced, is focused onto the target screen 16, causing its various elemental areas to acquire electrical characteristics corresponding to the amount of light produced upon them by the various portions of the focused image of the object 18. The electron gun 14 directs a beam at the target screen 16 and this beam is caused to be scanned according to a conventional television scanning pattern by means of deflection coils 20. As the scanning beam traverses elemental areas of the target screen 16, it encounters different electrical characteristics caused by the light from the object 18. As a result, corresponding amounts of electrical current are caused to flow down through an output line 22 and through a load resistor 24 to ground. The variations in voltage produced at the upper end of the load resistor 24 will correspond electrically to the light variations in different portions of the image of the object 18. These voltage variations are processed and gated in a manner to be described and are directed to an output terminal 25 for utilization.

As stated above, the scanning electron beam from the gun 14, in addition to providing signals at the upper end of the load resistor 24, also serve to electrically neutralize the elemental areas of the target screen 16, so that the screen will thereafter be free to accept a new image for a subsequent scanning. Such neutralization however is not completed by a single scan; and it is the elimination of the effects of this lack of complete removal which is provided by the remainder of the structure of FIG. 1.

As shown in FIG. 1, there is provided a shutter arrangement between the object 18 and the target screen 16 of the camera 10. This shutter arrangement comprises a rotating disc 26 mounted to turn immediately in front of the target screen 16. The disc 26 is rotated at a speed of approximately 15 revolutions per second by means of a drive motor 28. A segmental slit 30 is cut through a portion of the disc 26; and during the portion of each revolution during which the slit 30 passes over the target screen 16, the target screen will then be exposed to the object 18 and will receive an image therefrom. The slit 30, is of such a width that the target screen 16 becomes exposed to the object 18 for a period of time less than the duration of a single field of scan produced by the deflection device 20 upon the electron beam. Correspondingly, the remainder of the disc 26 masks the target screen 16 from the object 18 for a period of time in excess of that required for several scans of the electron beam.

There is provided a scan control system which is synchronized with the rotating disc 26. To this end there is provided on the disc 26 an element 32 of magnetic material located a distance (A) in advance of the slit 30 in the direction of rotation of the disc 26. The distance (A) is chosen such that for the speed of rotation of the disc 26, the magnetic element 32 will pass by a magnetic pickup head 34 at a time $T_1$ prior to the passage of the slit 30 over the target screen 16 of the camera 10.

The pickup head 34 is fixedly mounted so that for each revolution of the disc 26 it will produce an electrical pulse $P_1$ such as is shown in FIG. 2*a*. These pulses are amplified in a reference pulse amplifier 36 and are supplied to one input of a phase comparator 38. The output of the phase comparator 38 is used to control the output frequency of a scan control oscillator 40. This scan control oscillator control 40 has a nominal frequency output of 31.5 kc. The output of the scan control oscillator 40 is supplied to a first frequency divider circuit 42 which produces an output frequency of 60 cycles per second. This output frequency is supplied to a vertical pulse former 44 which generates vertical synchronizing pulses at the 60 cycle per second rate. These vertical synchronizing pulses $P_v$ (FIG. 2*b*), occur at a 60 cycle per second rate. The vertical synchronizing pulses are supplied to a second frequency divider circuit 46 which produces a 15 cycle per second output and applies it to a second input to the phase comparator circuit 38. As a result of the phase comparison between the reference pulses $P_1$ and the 15 cycle per output of the second frequency divider 46, the phase and frequency of the scan control oscillator 40 is controlled accordingly so that a proper synchronization between the scan control pulses and the rotation of the disc 26 can be maintained. The vertical pulses $P_v$ supplied by the vertical pulse former 44 are also supplied to a beam deflection circuit 48 and applied to the deflection device 20 of the camera 10. Additionally there is provided a third frequency divider 50 which receives the 31.5 kc. output from the scan control oscillator 40 and produces horizontal synchronizing pulses $P_H$ at a rate of 15.7 kc. These horizontal synchronizing pulses are also supplied to the deflection circuit 48 for control of the horizontal scan of the beam produced by the electron gun 14. It will thus be seen that the horizontal and vertical deflection signals are applied to the deflection device 20 in such a manner that the scan of the electron beam produced by the gun 14 is synchronized with the rotation of the disc 26.

The reference pulses $P_1$ produced by the pickup head 34 are also supplied to one input of a first flip-flop circuit 52. At the same time the vertical synchronizing pulses $P_v$ are supplied from the output of the vertical pulse former 44 to another input to the first flip-flop circuit 52. The flip-flop circuit 52 is thereby caused to produce a pulse $P_2$ which, as shown in FIG. 2(*c*), has a leading edge corresponding in time to the reference pulse $P_1$, and a trailing edge corresponding in time to the vertical pulse $P_v$ immediately subsequent to the reference pulse $P_1$. The pulse $P_2$ and the following vertical pulses $P_v$ are both fed to corresponding terminals of a second flip-flop circuit 54, which in turn produces a control pulse $P_3$ which, as shown in FIG. 2(*d*) lasts for the duration of 1 field of scan, i.e., the duration between successive vertical pulses $T_v$. As shown in FIG. 2(*d*) the control pulse $P_3$ has a leading edge corresponding with the trailing edge of the pulse $P_2$, and a trailing edge corresponding with the next successive vertical pulse $P_v$. The control pulse $P_3$ is supplied to the electron gun 14 of the camera 10 and serves to hold the electron gun 14 inoperative for the duration of the pulse $P_3$.

The control pulse $P_3$ is additionally supplied along with the vertical pulse $P_V$ to a third flip-flop circuit 56. This circuit produces a gate pulse $P_4$ (FIG. 2(*e*)), which lasts for a duration corresponding to that of the scan period immediately following the control pulse $P_3$. The gate pulse $P_4$ is supplied to control the opening of a gate circuit 58 interposed in a signal transmission line 60 which extends from the upper end of the load resistor 24 to the output terminal 25. The video signals taken from the upper end of the load resistor 24 pass through the line 60 to a shaping circuit 64 in advance of the gate circuit 58. In the shaping circuit 64, the video signals receive synchronizing pulses from the deflection circuit 48.

In operation of the above described circuit it will be noted that the slit 30 in the rotating disc 26 passes over the target screen 16 at a time $T_1$ following each reference pulse $P_1$. As the slit passes over the target screen 16, the screen is exposed to the object 18 for a period of time $T_2$ which is shorter than the duration $T_V$ of a single field of scan, (the duration between successive vertical synchronizing pulses), as shown in FIG. 2(*f*). During this time, the image of the object 18 is focused onto the target screen 16, causing its various elemental segments to become electrically activated in a manner corresponding to the intensity of light which each of them receives. During this time, $T_2$, the control pulse $P_3$ is in existence and as stated above, this control pulse holds the electron gun 14 inoperative so that no electron beam scans over the target screen 16 while the new image is being supplied thereto.

Immediately following the occurrence of the pulse $P_3$, the pulse $P_4$ occurs for the duration, $T_V$, of a single field of scan. This pulse opens the gate circuit 58 and allows the signals $S_1$ (FIG. 2(*g*)) produced by the now operative electron gun 14 to pass through to the output terminal 25. At the end of the scan, the pulse $P_4$ terminates, thus closing the gate circuit 58 to the passage of further outputs signals. However, the electron gun 14 continues to operate and the deflection circuit 48 causes two successive scans to occur to produce video signals $S_2$ and $S_3$ (FIG. 2(*g*)) which, though of lower intensity than the signal produced by the first scan $S_1$, are nevertheless finite. These signals however do not appear at the output terminal 52 because the gate circuit 58 is closed during their occurrence. The occurrence of these scans however does have the effect of completing the removal of the residual image which was left over on the target screen 16 following the first scan $S_1$. The signals appearing at the output terminal 25 thus appear as shown in FIG. 2(*h*).

It will be noted that in the above described situation the slit 30 of the rotating disc 26 exposed the objects 18 to the target screen 16 at a time coincident with the occurrence of the vertical synchronizing pulse $P_V$. However, this does not necessarily have to occur so long as the following relationship is maintained:

$$T_V \geq T_3 \geq T_1$$

where:

$T_V$=the duration of a field of scan $T_3$=the time between a reference pulse $P_1$ and an exposure $T_1$=the time between a reference pulse $P_1$ and the following vertical synchronizing pulse $P_V$.

This relationship can be visually recognized in the timing diagram of FIG. 2(*k*).

It will be appreciated that the present invention, as described above, operated by causing the image of the televised object 18 to be stored upon the target screen 16 in the form of a charge image during the time that the slit 30 of the wheel 26 permits exposure. It will further be appreciated that only the video signals $S_1$ which result from the first scanning subsequent to each exposure appear at the output terminal 25. In the present situation, a shutter arrangement is closed for a period covering at least a plurality of fields of scan (e.g. three fields), so that the target screen 16 is actually subjected to three successive scans following each exposure. The second and third scans serve to complete a neutralization of the target screen 16 so as to eliminate any residual charge thereon which was not eliminated as a result of the first scan. Thus, the target screen 16 is nearly perfectly neutralized at the time of the next shutter opening. Consequently, the new image which is impressed upon this target screen 16 by the next shutter opening, is not contaminated by the residual effects from a previous exposure; thereby obtaining a higher resolution output.

It will be noted from FIG. 2(*h*) that the output signals which appear at the terminal 25 are intermittent in time and thus would correspond to an interrupted picture. These signals, however, can be used to produce a continuous train of video outputs by recording them upon a magnetic recorder such as a rotary-sheet type video tape recorder. In such case, each video signal completed would be reproduced successively a plurality of times to fill in the spaces between the signals $S_1$ in FIG. 2(*h*).

Having thus described the invention with particular reference to the preferred form thereof, it will be obvious to those skilled in the art to which the invention pertains, after understanding the invention, that various changes and modifications may be made therein without departing from the spirit and scope of the invention, as defined by the claims appended thereto.

What is claimed as new and desired to be secured by Letters Patent is:

1. A method for taking television pictures, said method comprising the steps of intermittently exposing a photoelectrically sensitive screen to light images from objects whose picture is to be taken and shielding said screen from the light images during the intervals between successive exposures, thereby to produce electrical characteristics in elemental areas of the screen which are representative of the light intensity imposed thereon by the image during each exposure, electronically scanning said screen successively a plurality of times during each of said intervals between successive exposures to produce electrical signals corresponding to the electrical characteristics of said elemental areas and at the same time to neutralize said electrical characteristics, and gating the so produced electrical signals to remove therefrom all signals except those produced during the first electronic scan following each exposure.

2. A method as in claim 1 wherein said electronic scanning is interrupted during said exposures.

3. A method as in claim 1 wherein there are produced a given integral number of scans between each exposure.

4. A method as in claim 1 wherein the scans are synchronously related to said exposures.

5. Apparatus for taking television pictures comprising a photoelectrically sensitive target screen, the elemental areas of which attain electrical characteristics corresponding to the intensity of light energy imposed thereon, means including a shutter arrangement for intermittently exposing said target screen to light images from objects whose pictures are to be taken, electronic scanning means arranged to successively scan said target screen, thereby to produce electrical signals corresponding to the electrical characteristics of said elemental areas and also to neutralize said electrical characteristics, means arranged to control said scanning means to produce several successive scans between successive exposures produced by said shutter arrangement, signal output means including gating means and gate control means arranged to limit the opening of said gating means to periods commensurate to the first field of scan following each such exposure.

6. Apparatus as in claim 5 further including means arranged to prevent said scanning means from scanning said target screen during said exposures.

7. Apparatus as in claim 5 wherein said shutter arrangement is arranged to be driven such that each exposure of said target screen is of less duration than the duration of each scan.

8. Apparatus as in claim 5 wherein said shutter arrangement and scan control means are arranged to cause said shutter means to open and close within the duration of a single scan.

9. Apparatus as in claim 5 wherein said shutter arrangement is constructed to expose said target screen at intervals displaced in time by durations several times greater than the duration of such exposure.

10. Apparatus as in claim 5 wherein said means arranged to control said scanning means comprises an oscillator, scan initiating pulse forming means driven by said oscillator, means for generating reference pulses corresponding to the operation of said shutter arrangement and phase comparison means arranged to control the frequency of said oscillator based upon changes in the phase relationship of said reference pulse and said scan initiating pulses.

11. Apparatus as in claim 5 wherein said shutter arrangement includes a wheel formed with a slit and means for rotating said wheel continuously in front of said target screen so that said target screen is exposed to said object when said slit passes over said screen.

12. Apparatus as in claim 11 wherein said slit occupies a minor sectorial portion of said wheel.

13. Apparatus as in claim 10 wherein said gate control means includes first, second and third switching circuits electrically interconnected such that each is switchable in one direction by said initiating pulses, the first being switchable in the other direction by said reference pulses, the second being switchable in the other direction by switching of the first in said one direction and the third being switchable in the other direction by switching of the second in said one direction and means connecting the output of the third switching circuit to said gating means to produce gating when said third circuit is switched to its one direction.

14. Apparatus as in claim 13 wherein said target screen and electronic scanning means form portions of a vacuum type camera tube, said scanning means including means for generating an electron beam and deflection means for causing said beam to impinge upon and scan over said target screen, and means electrically interconnecting the output of said second switching circuit to said electron beam generating means in a manner such that said beam is terminated while said second switching circuit is switched in its said other direction.

References Cited

UNITED STATES PATENTS

| | | | |
|---|---|---|---|
| 3,284,567 | 11/1966 | Southworth | 178—7.2 |
| 3,303,271 | 2/1967 | Hecker | 178—7.2 |

ROBERT L. GRIFFIN, Primary Examiner

A. H. EDDLEMAN, Assistant Examiner